United States Patent [19]

Usui

[11] Patent Number: 5,245,687
[45] Date of Patent: Sep. 14, 1993

[54] OPTICAL FIBER COIL UNIT FOR A FIBER OPTIC GYRO

[75] Inventor: Ryuji Usui, Tokyo, Japan

[73] Assignee: Japan Aviation Electronics Industry Limited, Tokyo, Japan

[21] Appl. No.: 904,673

[22] Filed: Jun. 26, 1992

[30] Foreign Application Priority Data

Jul. 1, 1991 [JP] Japan .................. 3-160522

[51] Int. Cl.5 .................. G02B 6/04; G01B 9/02; B65H 75/02
[52] U.S. Cl. .................. 385/134; 385/136; 385/137; 385/147; 356/350; 242/118; 242/170
[58] Field of Search .............. 385/134, 135, 136, 137, 385/147, 115; 356/349, 350; 242/170, 171, 176, 178, 177, 118

[56] References Cited

U.S. PATENT DOCUMENTS

| | | | |
|---|---|---|---|
| 4,768,856 | 9/1988 | Hofmann et al. | 385/134 X |
| 4,995,698 | 2/1991 | Myers | 385/134 X |
| 5,031,982 | 7/1991 | Redford | 385/147 |
| 5,058,969 | 10/1991 | Peterson et al. | 385/134 X |
| 5,161,208 | 11/1992 | Christie et al. | 385/128 |
| 5,181,270 | 1/1993 | Hsu et al. | 385/134 |
| 5,181,271 | 1/1993 | Jenkins | 385/135 |

Primary Examiner—Brian Healy
Attorney, Agent, or Firm—Pollock, Vande Sande and Priddy

[57] ABSTRACT

A cylindrical bobbin having flanges at both ends thereof is formed as a unitary structure, using a material of thermal conductivity nearly equal to or lower than that of an optical fiber coil, and the optical fiber coil is wound on a housing portion defined between the flanges. An annular member is mounted on the bobbin to cover the housing portion on the outside of the optical fiber coil, forming an annular case for housing the optical fiber coil, together with the bobbin. The annular member is also made of a material which has a thermal conductivity nearly equal to or lower than that of the optical fiber coil.

4 Claims, 3 Drawing Sheets

OPTICAL FIBER COIL UNIT FOR A FIBER OPTIC GYRO

BACKGROUND OF THE INVENTION

The present invention relates to an optical fiber coil unit with an optical fiber wound on a bobbin for use in, for example, an optical fiber sensor of a fiber optic gyro.

FIG. 1 shows a conventional optical fiber coil unit for use in a fiber optic gyro. As shown, the conventional optical fiber unit has an optical fiber coil 12 wound on a cylindrical bobbin 11 mounted on a flat support plate 13. When a rotational angular rate is applied to the optical fiber coil 12 through which clockwise and counterclockwise light beams are propagating, a phase difference arises between the two light beams. By electrically detecting the phase difference, the applied angular rate is measured.

It is well-known in the art that when a sensing portion (an optical fiber coil) of a gyro using a ring-shaped optical fiber coil undergoes a nonuniform temperature change, a phase difference is caused between the clockwise and counterclockwise light beams propagating through the optical fiber of the sensing portion, developing a drift in the gyro output.

As a solution to this problem, there is proposed in Japanese Patent Application Laid-Open Gazette No. 80581/89 a construction wherein both end portions of an optical fiber wound around a bobbin are disposed adjacent to each other so that they are equally influenced by heat.

With such a structure, however, since respective layers of the coil are wound alternately, the winding end portion of the optical fiber layer crosses over the underlying optical fiber layer and a stress is induced in the optical fiber at the crossover portion, and consequently, a substantial ambient temperature change will cause a marked change in the light propagation characteristic of the stress-induced portion, causing a substantial drift in the gyro output.

Moreover, even if the optical fiber is wound in a symmetrical configuration with its opposite ends disposed adjacent to each other, a time lag occurs in heat conduction due to the heat conductivity of the optical fiber itself until symmetrical portions of the fiber reach the same temperature, and in this lag time, a difference is caused between the propagation characteristics for the clockwise and counterclockwise light beams, resulting in a drift of the gyro output.

Thus, even such various optical fiber winding structures cannot satisfactorily reduce the drift in the gyro output which is caused by a temperature change. From the viewpoint of making the temperature change in the optical fiber uniform throughout it, it has been customary to make the coil bobbin 11 of a metal of high thermal conductivity, such as aluminum (Al), so that the optical fiber coil 12 is subjected to as uniform temperature as possible over the entire length thereof, but this attempt has also failed to reduce the drift in the gyro output due to an ambient temperature change.

SUMMARY OF THE INVENTION

It is therefore an object of the present invention to provide an optical fiber coil unit which is free from the above-mentioned defects of the prior art and keeps down the drift in the gyro output due to a temperature change when the coil unit is employed in a fiber optic gyro.

According to the present invention, the optical fiber coil unit for a fiber optic gyro comprises: a bobbin made of a material whose thermal conductivity is nearly equal to or lower than that of the optical fiber of the coil, the bobbin having flanges at both ends thereof; the optical fiber coil is wound around the bobbin between the flanges; and an annular member with which the optical fiber coil housing portion defined by the flanges is covered from the outside thereof to form an annular case, the annular member being made of a material whose thermal conductivity is nearly equal to or lower than that of the optical fiber.

With such as construction, the entire optical fiber coil is covered with a material of low thermal conductivity, and consequently, the drift in the gyro output due to the influence of an ambient temperature change can be suppressed effectively.

It is also possible to adopt a construction in which the annular case is mounted on a support plate by a leg whose radial sectional area is smaller than the area of one end of the flange forming the annular case or the area of the outer peripheral surface of the annular member so as to keep down the quantity of heat from the support plate to the annular case.

DESCRIPTION OF THE PREFERRED EMBODIMENTS

Figure 1:
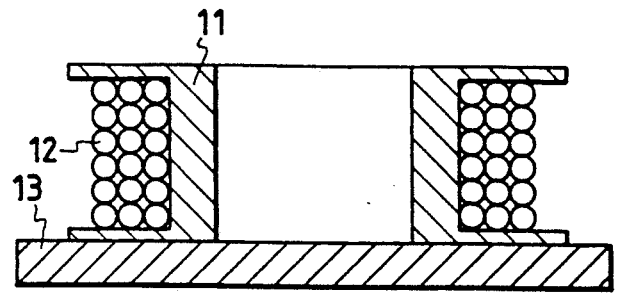
FIG. 1 is a sectional view showing a conventional optical fiber coil unit.
Figure 2:
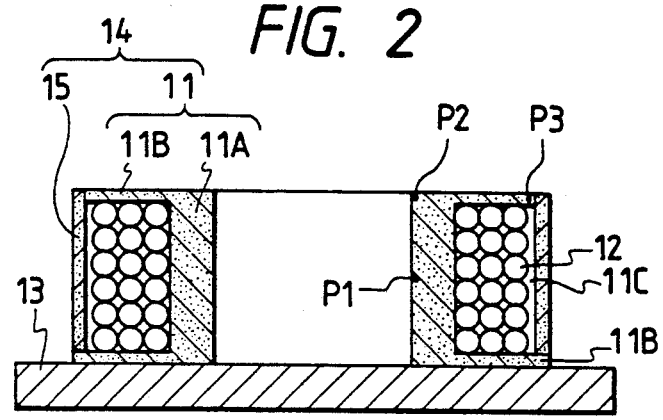
FIG. 2 is a sectional view illustrating a first embodiment of the optical fiber coil unit according to the present invention.

FIG. 2 illustrates a first embodiment of the optical fiber coil unit according to the present invention. Reference numeral 13 indicates a support plate as of aluminum (Al), on which an annular case 14 having housed therein the optical fiber coil 12 is fixedly mounted. The annular case 14 is formed by a cylindrical bobbin 11 of a material of low heat conductivity, such as ceramics, and a ceramic annular member 15 which covers a housing portion 11C defined by flanges 11B forming the bobbin 11. The optical fiber coil 12 is housed in the annular case 14 to form the optical fiber unit.

It is preferable that the thermal conductivity of the bobbin 11 and the annular member 15 be nearly equal to or lower than the thermal conductivity of the optical fiber coil 12. For instance, when the optical fiber coil 12 is formed by a quartz fiber whose thermal conductivity is $3.5 \times 10^{-4}$ cal/mm·sec·°C., the bobbin 11 and the annular member 15 are formed of ceramics which have a thermal conductivity nearly equal to or lower than that of the quartz fiber. It is also possible to use polyamide resin (thermal conductivity: $3.6 \times 10^{-5}$ cal/mm·sec·°C.) or some other synthetic resins for the bobbin 11 and the annular member 14. The bobbin 11 and the annular member 14 need not always be made of the same material.

Figure 3:
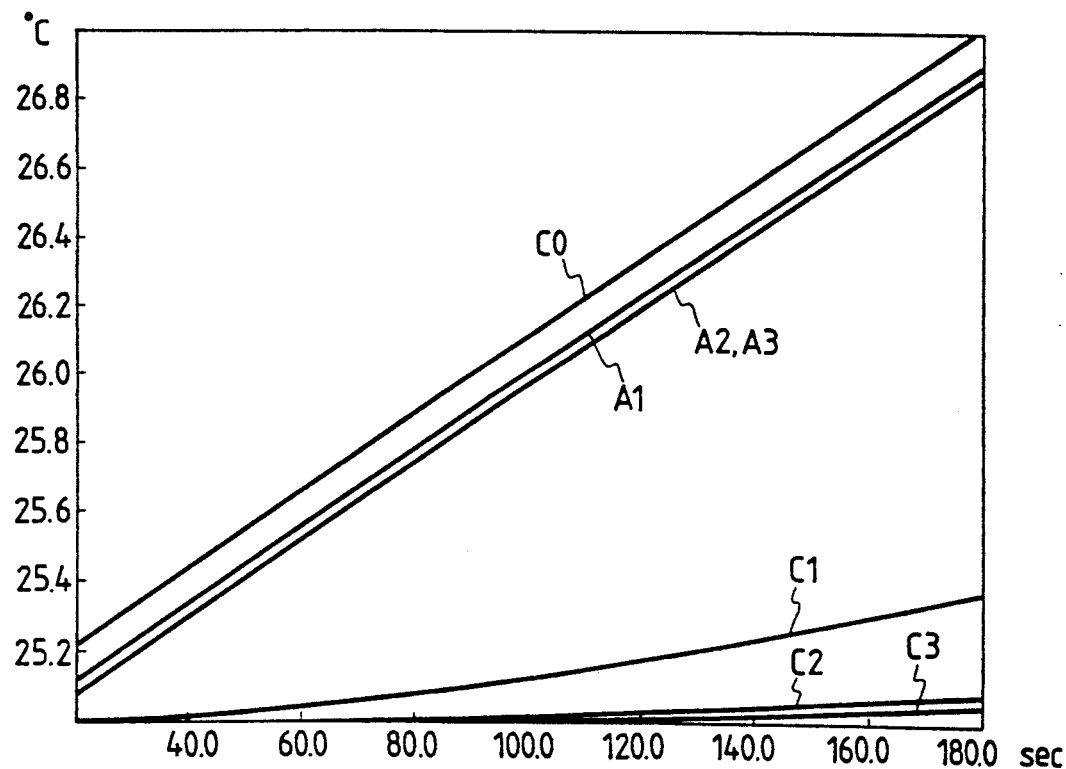
FIG. 3 is a graph showing temperature changes at three points on the coil bobbin when a temperature change was caused in the support plate.

In FIG. 3 there are indicated, by C1, C2 and C3, calculated values of temperatures changes at three point P1, P2 and P3 on the bobbin 11 made of ceramics having a thermal conductivity of $5 \times 10^{-4}$ cal/mm·sec·°C. in the case of the temperature of the support plate 13 made of aluminum (Al) being raised, with the annular member 15 taken off in the FIG. 2 embodiment. For comparison purposes, temperature changes at the same positions on the conventional bobbin 11 made of aluminum (thermal conductivity: $4 \times 10^{-2}$ cal/mm·sec·°C.) are indicated by A1, A2 and A3. The axial length, outer diameter and wall thickness of the cylindrical portion of the bobbin 11 are 30 mm, 50 mm and 2.5 mm, respectively, and the outer diameter and thickness of the flange 11B are 70 mm and 1.5 mm, respectively. The aluminum support plate 13 is a square plate measuring $75 \times 75$ mm and 6 mm thick.

Figure 4:
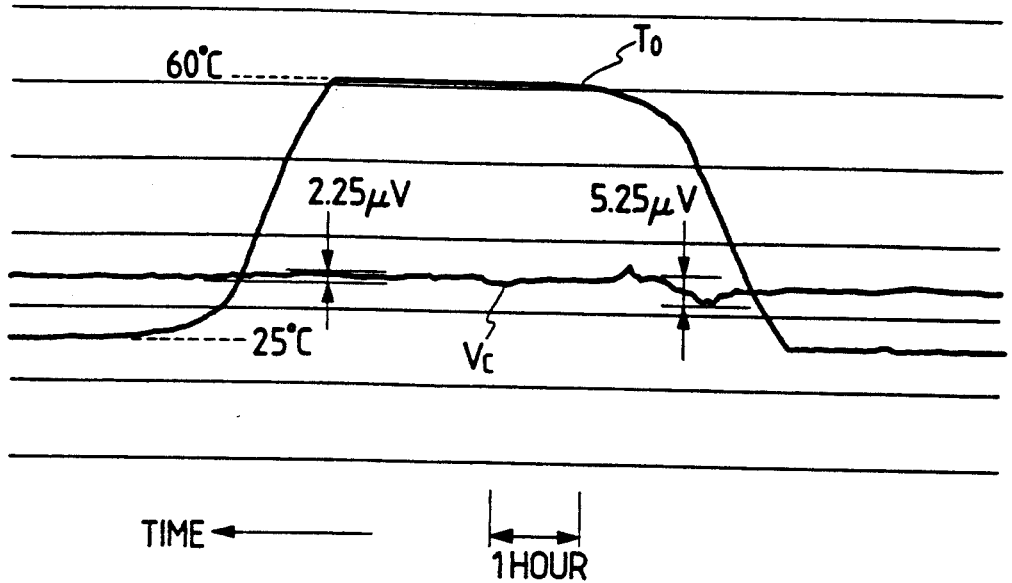
FIG. 4 is a graph showing a change in the gyro output when a temperature change in the support plate was provided to a ceramic bobbin.
Figure 5:
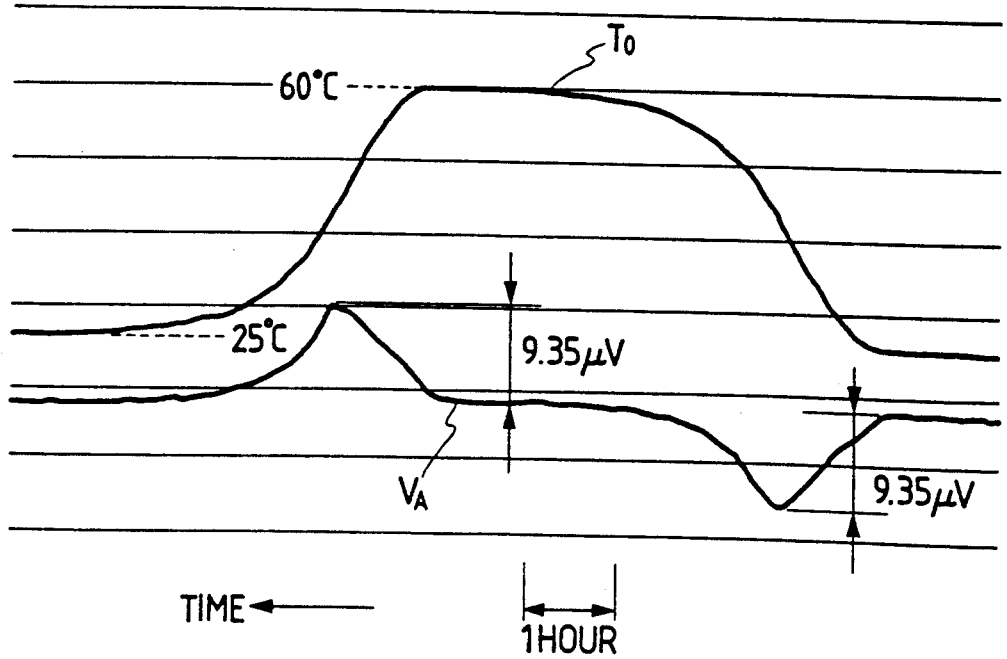
FIG. 5 is a graph showing a change in the gyro output when a temperature change in the support plate was provided to an aluminum bobbin.

In FIG. 4 there are indicated, by VC, measured values of the output voltage of a fiber optic gyro having built therein the optical fiber unit of the FIG. 2 embodiment in the case where the temperature of the ceramic bobbin 11 was changed by heating and then cooling the aluminum support plate 13 as indicated by TO, with the annular member 15 removed. No angular rate was applied to the optical fiber coil unit in this case. FIG. 5 similarly shows the gyro output VA and the temperature To of the support plate 13 in the case where the bobbin 11 was made of aluminum (Al). In either case, the support plate temperature TO was increased from 25° C. to 60° C. and then decreased again to 25° C.

As is evident from FIG. 3, when a temperature change is caused in the bobbin 11 from the side of the support plate 13, the temperature changes A1, A2 and A3 in the aluminum bobbin follow the temperature change TO in the support plate 13 in a short time and the temperature of the bobbin varies substantially uniformly throughout it, but the temperature change in the ceramic bobbin is very slow in following the temperature change of the support plate 13. Therefore, as shown in FIG. 4, drifts in the gyro output were as small as 5.25 and 2.25 $\mu V$ when the temperature of the support plate 13 was increased and decreased, respectively.

In the case of the aluminum bobbin, the temperature change in the support plate 13 is transmitted to the outermost layer of the optical fiber coil 12 in a short time. However, since the heat conductivity of the optical fiber coil 12 itself is on the order of $10^{-4}$ cal/mm·sec·°C., far lower than the heat conductivity of aluminum (Al), the temperature of the optical fiber lying apart from the contact surface of the bobbin 11 with the optical fiber coil 12 lags very much in following the temperature change, providing a nonuniform temperature distribution in the layered block of the optical fiber coil 12. On this account, as shown in FIG. 5, a drift as large as 9.35 $\mu V$ developed in the gyro output when the temperature was increased and decreased, respectively.

The above reveals that it is effective in reducing the drift to use a material of low heat conductivity for the bobbin 11 surrounding the optical fiber coil 12 to thereby delay as much as possible the transmission of the temperature change to the optical fiber coil 12 through the bobbin 11. In this sense, with such a construction as shown in FIG. 2 in which the housing portion 11C is covered with the annular member 15 on the outside of the optical fiber coil 12 to form the annular case 15, the optical fiber coil 12 is not exposed directly to a change in ambient temperature, and consequently, the output drift of the fiber optic gyro can be reduced significantly. That is, even if a temperature change is applied to the optical fiber unit three-dimensionally in any direction, the output drift component of the fiber optic gyro with the optical fiber unit built therein can be suppressed to a very small value, because the temperature change is gently conveyed into the annular case 14.

Figure 6:
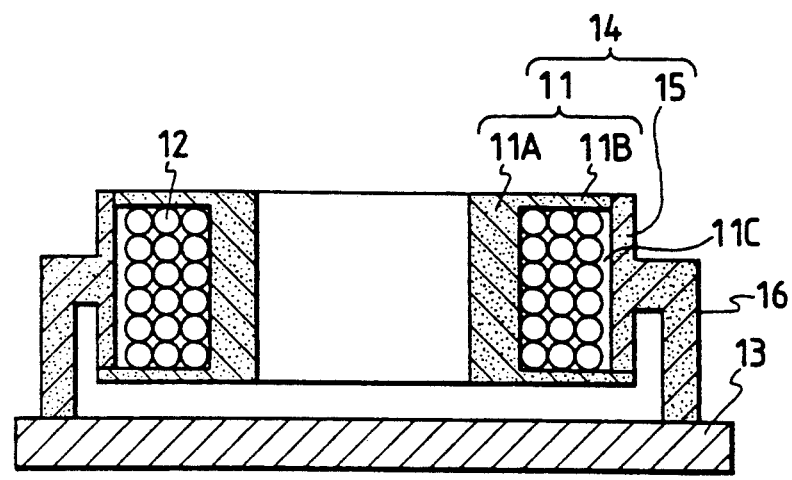
FIG. 6 is a sectional view illustrating a second embodiment of the present invention.

FIG. 6 illustrates a second embodiment of the optical fiber coil unit according to the present invention, in which the annular member 15 has substantially centrally thereof in its axial direction a leg 16 which is an inverted L-shaped in cross section. The lower end of the leg 16 extends down past the lower end face of the bobbin 11 and is fixed to the support plate 13, defining a space between the top of the support plate 13 and the lower end face of the bobbin 11. The annular member 15 and the leg 16 are formed as a unitary structure, using ceramics or synthetic resin whose heat conductivity is nearly equal to or lower than that of the optical fiber coil 12, and the cross-sectional area of the leg 19 in its radial direction is selected smaller than the area of the outer peripheral surface of the annular member 15 to reduce heat conduction thereto from the support plate 13. The construction of the bobbin 11 with the optical fiber coil 12 wound thereon is the same as in the FIG. 2 embodiment.

Figure 7:
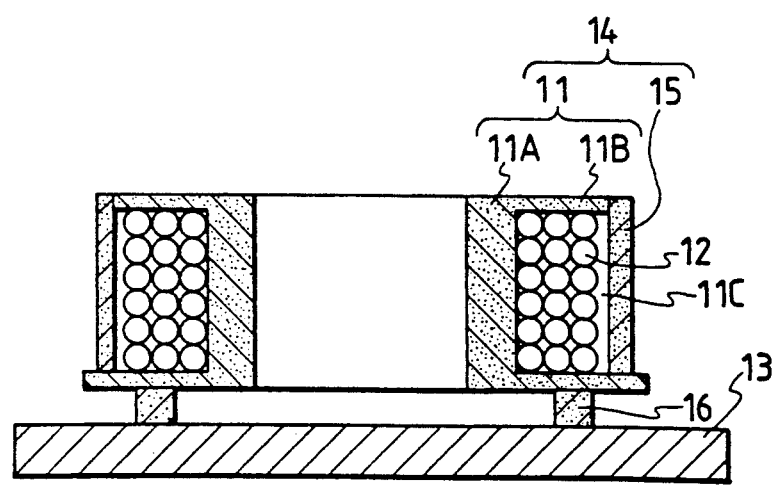
FIG. 7 is a sectional view illustrating a third embodiment of the present invention.

FIG. 7 illustrates a third embodiment of the present invention, in which a ring-shaped leg 16 of a diameter smaller than that of the flange 11B is interposed between the lower end face of the flange 11B and the top of the support plate 13. The leg 16 may be formed as a unitary structure with the bobbin 11 or may also be formed separately of a low heat conductivity material. The cross-sectional area of the leg 16 in its radial direction is selected smaller than the area of the lower end face of the flange 11B so as to reduce heat conduction thereto from the support plate 13. This embodiment is identical in construction with the FIG. 2 embodiment except for the above.

In the above embodiments the optical fiber coil 12 housed in the annular case 14 may be a layered coil structure in which an optical fiber is simply wound in layers, or it may be a structure in which an optical fiber is wound with both ends thereof disposed adjacent to each other as disclosed in the aforementioned Japanese patent laid-open gazette. The support plate 13 may be made of a high heat conductivity material such as aluminum, or low heat conductivity material such as ceramics or synthetic resin.

As described above, according to the present invention, the optical fiber coil 12 is housed in the annular case 14 of poor heat-insulating material, and therefore, even if ambient temperature changes abruptly, the temperature change that is conveyed to the optical fiber coil 12 is so gentle that the drift in the fiber optic gyro output can be held small.

It will be apparent that many modifications and variations may be effected without departing from the scope of the novel concepts of the present invention.

What is claimed is:

1. An optical fiber coil unit for a fiber optic gyro comprising:
   an optical fiber coil:

a bobbin having said optical fiber coil wound thereon in a housing portion defined by flanges formed at opposite ends of said bobbin, said bobbin being made of a material which has a thermal conductivity nearly equal to or lower than that of the optical fiber of said optical fiber coil;

an end face of one of said flanges being fixed to a support plate; and an annular member which covers said housing portion between said flanges on the outside of said housing portion to form an annular case, said annular member being made of a material which has a thermal conductivity nearly equal to or lower than that of said optical fiber.

2. An optical fiber coil unit for a fiber optic gyro comprising:

an optical fiber coil;

a bobbin having said optical fiber coil wound thereon in a housing portion defined by flanges formed at opposite ends of said bobbin, said bobbin being made of a material which has a thermal conductivity nearly equal to or lower than that of the optical fiber of said optical fiber coil;

an annular member which covers said housing portion between said flanges on the outside of said housing portion to form an annular case, said annular member being made of a material which has a thermal conductivity nearly equal to or lower than that of said optical fiber;

leg means extended from the outer peripheral surface of said annular member and projecting outwardly from said flanges axially of said bobbin; and a support plate disposed at a distance from said flanges, an end portion of said leg means being fixed to said support plate, said leg means having a thermal conductivity nearly equal to or lower than that of said optical fiber, and the cross-sectional area of said leg means in its radial direction being smaller than the outer surface area of said annular member.

3. An optical fiber coil unit for a fiber optic gyro comprising:

an optical fiber coil;

a bobbin having said optical fiber coil wound thereon in a housing portion defined by flanges formed at opposite ends of said bobbin, said bobbin being made of a material which has a thermal conductivity nearly equal to or lower than that of the optical fiber of said optical fiber coil;

an annular member which covers said housing portion between said flanges on the outside of said housing portion to form an annular case, said annular member being made of a material which has a thermal conductivity nearly equal to or lower than that of said optical fiber;

leg means formed in contact with an end face of one of said flanges and having a diameter smaller than said flanges; and a support plate disposed opposite said one flange, said leg means being interposed between said one flange and said support plate, said leg means having a thermal conductivity nearly equal to or lower than that of said optical fiber, and the cross-sectional area of said leg means in its radial direction being smaller than the area of said end face of said one flange.

4. The optical fiber coil unit of claim 1, 2 or 3 wherein said bobbin is formed as a unitary structure with said flanges, using ceramics.

* * * * *